United States Patent Office 3,344,156
Patented Sept. 26, 1967

3,344,156
PROCESS FOR THE PREPARATION OF EQUILIN AND INTERMEDIATE OBTAINED THEREFROM
Jehan F. Bagli, Montreal, Quebec, Peter F. Morand, Ottawa, Ontario, Douglas S. Irvine, Rosemere, Quebec, Claude Vezina, Oka, Quebec, and Karel Wiesner, Westmount, Quebec, Canada, assignors to American Home Products Corporation, New York, N.Y., a corporation of Delaware
No Drawing. Filed Dec. 10, 1963, Ser. No. 329,395
15 Claims. (Cl. 260—397.4)

ABSTRACT OF THE DISCLOSURE

There is disclosed herein a process for preparing equilin from 19-hydroxyandrosta-4,6-diene-3,17-dione, via the intermediates 3,19-diacetoxyandrosta-3,5,7-trien-17-one, 19-acetoxyandrosta-4,7-diene-3,17-dione, and 19-acetoxyandrosta-1,4,7-triene-3,17-dione. The last-named intermediate is converted to equilin by treatment with a base, and the first two intermediates may be converted to equilin microbiologically.

---

This invention relates to a method of synthesis of equilin (1,3,5,7-estratetraene-3-ol-17-one, V), a powerful estrogen found in nature, and valuable novel intermediates secured therein. More specifically, this invention relates to a process which appears to be superior to the process known at present for the synthesis of equilin [J. A. Zderic et al., Steroids, 1, 233 (1963); J. Am. Chem. Soc., 80, 2596 (1958); U.S. Patent 3,067,212 (1962)] in that the process according to this invention uses 19-hydroxyandrosta-4,6-diene-3,17-dione (I) as the starting material, a compound which has been described by K. Heusler et al. in Experientia, vol. 18, p. 464 (1962), rather than estrone which has been used in earlier syntheses of equilin.

19-hydroxyandrosta-4,6-diene-3,17-dione (I) may be easily obtained in good yields from commercially available androstenolone acetate by the procedure described by Heusler et al. (loc. cit.).

19-hydroxyandrosta-4,6-diene-3,17-dione (I) is converted by conventional means to its 3-enol acetate 19-acetate, 3,19-diacetoxyandrosta-3,5,7-triene-17-one (II). The latter enol acetate (II) is then hydrolysed to the deconjugated ketone 19-acetoxyandrosta-4,7-diene-3,17-dione (III). Hydrolysis of the enol acetate (II) to the deconjugated ketone (III) is a new and unexpected reaction.

Although the deconjugation of steroidal $\Delta^4$-3-ketones via the base-catalysed hydrolysis of their enol acetates is well documented [see e.g. A. J. Birch, J. Chem. Soc., 2325 (1950); W. J. Dauben and J. F. Eastham, J. Am. Chem. Soc., 72, 2305 (1950); B. Belleau and I. F. Gallagher, ibid., 73, 4458 (1951)], Ringold and Malhotra have recently reported [Tetrahedron Letters No. 15, 669 (1962)] that they were unable to deconjugate steroidal $\Delta^{4,6}$-3-ketones.

Contrary to expectations, in the process of this invention the deconjugation of the $\Delta^{3,5,7}$-enol acetate (II) of a steroidal $\Delta^{4,6}$-3-ketone proceeds smoothly, by using a base-catalysed selective hydrolysis, to yield the desired deconjugated $\Delta^{4,7}$-3-ketone (III). Suitable bases for effecting the above selective hydrolysis and deconjugation are the alkali metal alkoxides of lower alkanols, such as, e.g. potassium methoxide or t-butoxide, or sodium methoxide, or alkali metal bicarbonates, preferably sodium bicarbonate in lower alkanols, preferably methanol.

In the above selective hydrolytic deconjugation, reaction time and temperature are the critical factors. It has been found that optimal yields of the deconjugated ketone (III) are best achieved by sampling the reaction mixture at frequent intervals; quenching the samples; determining the amounts of the deconjugated ketone (III) and of the starting material (the enol acetate II) in each sample by U.V. spectrography; and stopping the reaction by quenching when the U.V. spectrum indicates that all the enol acetate (II) has disappeared.

The above selective hydrolytic deconjugation may be carried out at temperatures from 0°–100° C., with the preferred range being from room temperature (usually 20°–24° C.) to the boiling temperature of the reaction mixture. The optimal time of reaction varies with the temperature. For optimal yields the time of reaction is varied in accordance with the temperature conditions maintained, the time periods of reaction becoming shorter at elevated temperatures than, e.g., when operating at room temperature. For example, when operating at room temperature, satisfactory yields of the desired $\Delta^{4,7}$-3-ketone (III) are obtained with reaction time of from 2 to 5 hours. On the other hand, when conducting the reaction at approximately 60° C. it is found that selective hydrolytic deconjugation with satisfactory yields takes place within 2 to 8 minutes.

Either 3,19-diacetoxyandrosta-3,5,7-triene-17-one (II) or 19-acetoxyandrosta-4,7-diene-3,17-dione (III) may be converted to equilin (V) when exposing those compounds to the activity obtainable in a neutral medium inoculated with, for example, the micro-organism Norcardia restrictus. This may be achieved by exposing those compounds to the enzymatic activity obtainable from a growing culture of Nocardia restrictus or to the enzymatic activity obtainable from the spores of the same organism in accordance with the procedure described in U.S. Patent 3,031,379.

Alternatively, 19-acetoxyandrosta-4,7-diene-3,17-dione (III) may be treated with dichloro-dicyano-p-benzoquinone to yield the intermediate 19-acetoxyandrosta-1,4,7-triene-3,17-dione (IV). Treatment of the latter compound with a base, such as, e.g. methanolic sodium hydroxide, followed by extraction with a water-immiscible solvent mixture, preferably benzene:ether 1:1, yields equilin (V).

The following formulae and examples will illustrate this invention.

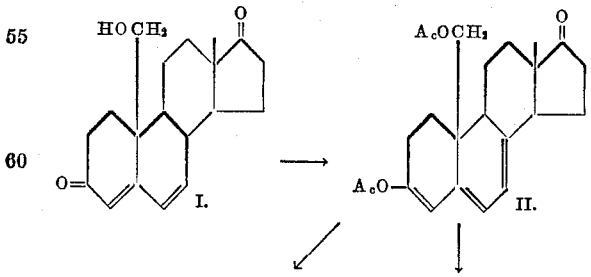

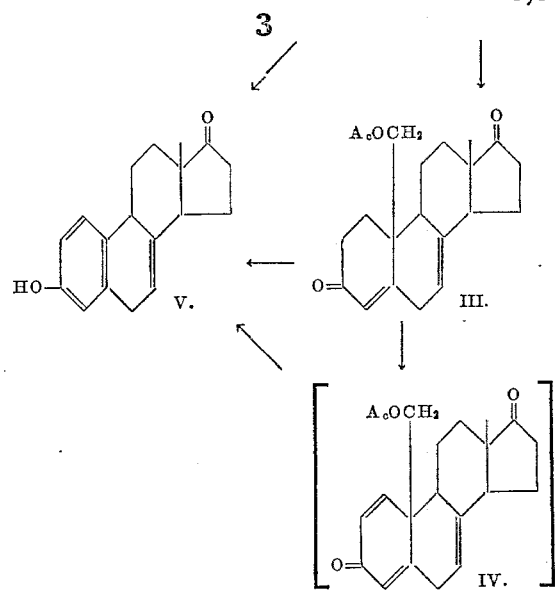

EXAMPLE 1

*3,19-diacetoxyandrosta-3,5,7-triene-17-one (II)*

To a suspension of 19-hydroxyandrosta-4,6-diene-3,17-dione (I, 10 g.) in freshly distilled acetic anhydride (200 ml. is added dry pyridine (2.8 ml.) and acetyl chloride (80 ml.). The solution thus formed is refluxed in a nitrogen atmosphere overnight. The reaction mixture is poured carefully in crushed ice and stirred until the precipitated oil begins to solidify. The solid is filtered and washed with water, dried and recrystallized from methanol to give pale yellow needles, M.P. 116–120° C., $\lambda_{max}$ 328 m$\mu$ ($\epsilon$ 14,900), 314 m$\mu$ ($\epsilon$ 20,400), 302 m$\mu$ ($\epsilon$ 17,620).

EXAMPLE 2

*19-acetoxyandrosta-4,7-diene-3,17-dione (III)*

To a solution of the enol acetate (II, 4.48 g.) in dry methanol (123 ml.) there is added sodium bicarbonate (8.9 g.), and the mixture is heated at the boiling point for 8 minutes during which time aliquots are removed and their U.V. spectra are recorded to check the progress of the reaction. When the reaction is found to be complete, the mixture is poured into 800 ml. of 1% acetic acid and extracted with ethyl acetate, washed with water, dried, and the solvent removed, to yield an oil, $\lambda_{max}$ 236 m$\mu$ ($\epsilon$ 11,000). This oil is chromatographed on alumina (Woelm, Act. III), and the eluates obtained with benzene and 5% ether in benzene yield 19-acetoxyandrosta-4,7-diene-3,17-dione (III), $\lambda_{max}$ 236 m$\mu$ ($\epsilon$ 12,620), $\nu_{max}$ 1727, 1660, 1624 cm.$^{-1}$.

When repeating the above procedure with 0.05 g. of the enol acetate (II), dissolved in 10 ml. of methanol, and adding 0.1 g. of sodium bicarbonate, the reaction is shown to be essentially complete after two minutes refluxing and compound III may be isolated in the manner described above.

When conducting the above selective hydrolytic deconjugation at room temperature (20°–24° C.), with stirring, with 0.1, 0.3, or 0.356 g. of the enol acetate (II), respectively, dissolved in 20, 60, and 10 to 20 ml. of methanol, respectively, adding two parts of sodium bicarbonate for each part of the enol acetate (II) used as starting material, with reaction times of 2 hours, 4.5 hours, and 2.5–3.5 hours, respectively, and working up as described above, it is found that the reaction mixture consists principally of the desired deconjugated $\Delta^{4,7}$-3-ketone (III) which is then recovered as described above.

EXAMPLE 3

*19-acetoxyandrosta-4,7-diene-3,17-dione (III)*

To a solution of 3,19-diacetoxyandrosta-3,5,7-triene-17-one (II, 0.1 g.) in 10 ml. of methanol there is added, in an atmosphere of nitrogen, a solution of 22 mg. of sodium metal in 10 ml. of methanol. The mixture is stirred at room temperature for 6 minutes and then quenched by pouring into saturated boric acid solution. Extraction with ethyl acetate and working up as described above yields the title compound, identical with the compound described in Example 2.

EXAMPLE 4

A culture of *Nocardia restrictus* (Ayerst Culture Collection No. B–226) is used to inoculate a medium of the following compositions:

| | | |
|---|---|---|
| "Cerelose" | g | 20 |
| "Edamin" | g | 20 |
| Corn steep liquor | g | 5 |
| Distilled water to pH 6.5 | l | 1 |

Incubation is continued at 25° C. for 64 hours. After this incubation period, the culture is centrifuged, washed twice with distilled water, recentrifuged, and resuspended in a 1% phosphate buffer solution (pH 7); the suspension is filtered through glass wool, centrifuged again and resuspended in a 1% phosphate buffer solution (pH 7). The resulting suspension contains no mycelium, but only cells which are identified as *oidiospores* when observed under the microscope. The suspension is distributed into 250 ml. Erlenmeyer flasks to the amount of 50 ml. per flask. Twenty-five mg. of 3,19 diacetoxyandrosta-3,5,7-triene-17-one (II) dissolved in 0.5 ml. methanol is charged into the spore suspension, 0.625 ml. of potassium cyanide solution (3.25 mg./ml.) in water is added, and the incubation is continued for 8 hours. Equilin, identical with an authentic sample, accompanied by minor amounts of estrone and dihydroequilenin, is isolated by chromatography on silica gel as the main product of the reaction. Alternatively, the same result is also obtained by using an actively growing culture of *Nocardia restrictus* instead of the spore suspension described above.

EXAMPLE 5

The procedure described in Example 4 is repeated with twenty-five mg. of 19-acetoxyandrosta-4,7-diene-3,17-dione (III) dissolved in 0.1 ml. of dimethylformamide which is charged into the spore suspension, and incubation is continued for 6 hours. Equilin, identical with an authentic sample, accompanied by minor amounas of equilenin, dihydroequilin, and dihydroequilenin, is isolated by chromatography on silica gel as the main product of the reaction. Alternatively, the same result is also obtained by using an actively growing culture of *Nocardia restrictus* instead of the spore suspension described above.

EXAMPLE 6

A solution of 19-acetoxyandrosta-4,7-diene-3,17-dione (III, 0.05 g.) in dry dioxane (7 ml.) containing dicyanodichloro-p-benzoquinone (0.04 g.) is refluxed for 17 hours. The solution is then cooled and the precipitated hydroquinone filtered. The filtrate is concentrated and taken up in benzene:ether (1:1) and a further amount of precipitate thus obtained is filtered off. The residue from the filtrate is taken up in benzene:ether (1:1, 6 ml.) and 2 ml. of 4% sodium hydroxide in methanol are added. The mixture is stirred at room temperature for 35 minutes, diluted with excess benzene:ether (1:1), and washed with water. The aqueous layer is extracted four times with benzene:ether (1:1). The organic phase is washed, dried over magnesium sulfate, and the solvent is removed. Chromatography of the residue gives equilin, M.P. 230–232° C. after crystallization from ethyl acetate, identical with an authentic sample.

We claim:
1. The process of preparing equilin which comprises treating 19 - hydroxyandrosta-4,6-diene-3,17-dione with acetic anhydride and acetyl chloride, thereby securing

3,19-diacetoxyandrosta-3,5,7-triene-17-one; hydrolysing said last-named compound to secure the deconjugated ketone by treating said 3,19-diacetoxyandrosta-3,5,7-triene-17-one with a basic compound selected from the group consisting of the alkali metal alkoxides of lower alkanols and alkali metal bicarbonates, thereby securing 19-acetoxyandrosta-4,7-diene-3,17-dione; and subjecting said last named compound to the activity of the microorganism *Nocardia restrictus* in neutral medium, thereby obtaining equilin.

2. The process of preparing equilin which comprises converting 19-hydroxyandrosta-4,6-diene-3,17-dione to 3,19-diacetoxyandrosta-3,5,7-triene-17-one; converting said last named compound to 19-acetoxyandrosta-4,7-diene-3,17-dione by treating said 3,19-diacetoxyandrosta-3,5,7-triene-17-one with a basic compound selected from the group consisting of alkali metal alkoxides of lower alkanols and alkali metal bicarbonates; treating said 19-acetoxyandrosta-4,7-diene-3,17-dione with dichloro-dicyano-p-benzoquinone, thereby securing 19-acetoxyandrosta-1,4,7-triene-3,17-dione; and treating said last-named compound with a base, thereby securing equilin.

3. The process of preparing equilin which comprises treating 19-hydroxyandrosta-4,6-diene-3,17-dione with acetic anhydride and acetyl chloride, thereby securing 3,19-diacetoxyandrosta-3,5,7-triene-17-one; treating said last-named compound with a basic compound selected from the group which consists of alkali metal alkoxides of lower alkanols and alkali metal bicarbonates, thereby securing 19-acetoxyandrosta-4,7-diene-3,17-dione; treating said last-named compound with dicyano-dichloro-p-benzoquinone, thereby securing 19-acetoxyandrosta-1,4,7-triene-3,17-dione; and treating said last-named compound with methanolic sodium hydroxide, thereby securing equilin.

4. The process of preparing equilin which comprises treating 19-hydroxyandrosta-4,6-diene-3,17-dione with acetic anhydride and acetyl chloride, thereby securing 3,19-diacetoxyandrosta-3,5,7-triene-17-one; treating said last-named compound with a basic compound selected from the group which consists of alkali metal alkoxides of lower alkanols and alkali metal bicarbonates, thus securing 19-acetoxyandrosta-4,7-diene-3,17-dione; and subjecting said last-named compound to the activity of the microorganism *Nocardia restrictus* in neutral medium, thereby obtaining equilin.

5. The process of preparing equilin which comprises treating 19-hydroxyandrosta-4,6-diene-3,17-dione with acetic anhydride and acetyl chloride, thereby forming 3,19-diacetoxyandrosta-3,5,7-triene-17-one; and exposing said last-named compound to the action of activity of *Nocardia restrictus*, thereby securing equilin.

6. The process which comprises treating 3,19-diacetoxyandrosta-3,5,7-triene-17-one with a basic compound selected from the group consisting of alkali metal alkoxides of lower alkanols and alkali metal bicarbonates, thus effecting selective hydrolysis and deconjugation whereby the compound 19-acetoxyandrosta-4,7-diene-3,17-dione is secured; and converting said last-named compound to equilin by subjecting said compound, in neutral solution, to action of the microorganism *Nocardia restrictus*.

7. The process which comprises treating 3,19-diacetoxyandrosta-3,5,7-triene-17-one with a basic compound selected from the group consisting of alkali metal alkoxides of lower alkanols and alkali metal bicarbonates, thus effecting selective hydrolysis and deconjugation whereby the compound 19-acetoxyandrosta-4,7-diene-3,17-dione is secured; treating said last-named compound with dicyano-dichloro-p-benzoquinone, thus securing 19-acetoxyandrosta-1,4,7-triene-3,17-dione; and treating said last-named compound with a base, thus securing equilin.

8. The process defined in claim 7 wherein said base is methanolic sodium hydroxide.

9. The process which comprises treating 19-acetoxyandrosta-4,7-diene-3,17-dione with dicyano-dichloro-p-benzoquinone at an elevated temperature, thus securing 19-acetoxyandrosta-1,4,7-triene-3,17-dione.

10. The process which comprises treating 19-acetoxyandrosta-4,7-diene-3,17-dione with dicyano-dichloro-p-benzoquinone at an elevated temperature, thus securing 19-acetoxyandrosta-1,4,7-triene-3,17-dione, and treating said last-named compound with a base thereby securing equilin.

11. The process of deconjugating 3,19-diacetoxyandrosta-3,5,7-triene-17-one which comprises treating said compound, at an elevated temperature, with a basic compound selected from the group which consists of alkali metal alkoxides of lower alkanols and alkali metal bicarbonates, thus securing 19-acetoxyandrosta-4,7-diene-3,17-dione.

12. The process of preparing 19-acetoxyandrosta-4,7-diene-3,17-dione by hydrolytic deconjugation of 3,19-diacetoxyandrosta-3,5,7-triene-17-one which comprises subjecting said 3,19-diacetoxyandrosta-3,5,7-triene-17-one in dry methanol solution to the action of a basic compound selected from the group which consists of alkali metal alkoxides of lower alkanols and alkali metal bicarbonates, said process being carried out at a temperature within the range room temperature to the boiling point of the reaction mixture, and for a period of time sufficient to effect said desired deconjugation.

13. The process in claim 12 wherein the period of time falls within the range two minutes to five hours.

14. The process of preparing 19-acetoxyandrosta-4,7-diene-3,17-dione by hydrolytic deconjugation of 3,19-diacetoxyandrosta-3,5,7-triene-17-one which comprises subjecting said 3,19-diacetoxyandrosta-3,5,7-triene-17-one in dry methanol solution to the action of a basic compound selected from the group which consists of alkali metal alkoxides of lower alkanols and alkali metal bicarbonates, said process being carried out at a temperature within the range room temperature to the boiling point of the reaction mixture, and for a period of time not exceeding about five hours.

15. 3,19-diacetoxyandrosta-3,5,7-triene-17-one.

References Cited
UNITED STATES PATENTS 3,162,655   12/1964   Bagli _____ 260—397.4

ELBERT L. ROBERTS, *Primary Examiner.*